United States Patent [19]

Keener et al.

[11] Patent Number: 5,550,991

[45] Date of Patent: Aug. 27, 1996

[54] PERSONAL COMPUTER SYSTEM HAVING HIGH SPEED LOCAL PROCESSOR BUS AND STORAGE CONTROLLER WITH FIFO MEMORY COUPLED DIRECTLY THERETO

[75] Inventors: Don S. Keener; Gregory J. Moore; Richard W. Voorhees, all of Boca Raton, Fla.

[73] Assignee: International Business Machines Corporation, Armonk, N.Y.

[21] Appl. No.: 411,916

[22] Filed: Mar. 28, 1995

Related U.S. Application Data

[63] Continuation of Ser. No. 712,233, Jun. 7, 1991.

[51] Int. Cl.[6] .......................... G06F 13/00; G06F 13/10; G06F 12/00
[52] U.S. Cl. ......................... 395/309; 364/DIG. 1; 364/DIG. 2; 364/238.3; 364/238.4; 364/239.7; 364/240; 364/243; 364/260; 364/260.1; 395/310; 395/427
[58] Field of Search ..................... 364/DIG. 1, DIG. 2, 364/238.3, 238.4, 239, 239.7, 240, 243, 260, 260.1; 395/310, 427

[56] References Cited

U.S. PATENT DOCUMENTS

| | | | |
|---|---|---|---|
| 4,288,860 | 9/1981 | Trost | 395/425 |
| 4,344,132 | 8/1982 | Dixon et al. | 395/250 |
| 4,935,894 | 6/1990 | Ternes et al. | 395/425 |
| 5,038,277 | 8/1991 | Altman et al. | 395/250 |
| 5,142,626 | 8/1992 | Arnold et al. | 395/275 |
| 5,175,825 | 12/1992 | Starr | 395/325 |
| 5,265,255 | 11/1993 | Bonevento et al. | 364/DIG. 1 |
| 5,287,476 | 2/1994 | Keener et al. | 395/824 |
| 5,299,315 | 3/1994 | Chin et al. | 395/250 |
| 5,301,343 | 4/1994 | Alvarez | 395/800 |
| 5,313,593 | 5/1994 | Barakat et al. | 395/325 |
| 5,353,417 | 10/1994 | Fuoco et al. | 395/325 |
| 5,371,861 | 12/1994 | Keener et al. | 395/325 |
| 5,440,693 | 8/1995 | Arnold et al. | 395/284 |
| 5,471,585 | 11/1995 | Barakat et al. | 395/308 |
| 5,485,585 | 1/1996 | Huynh et al. | 395/311 |

*Primary Examiner*—Tod R. Swann
*Assistant Examiner*—Tuan V. Thai
*Attorney, Agent, or Firm*—Anthony N. Magistrale

[57] ABSTRACT

This invention relates to personal computers, and more particularly to a personal computer using a small computer systems interface (SCSI) controller coupled directly to the local processor bus for controlling data transfer with storage memory devices such as fixed or removable media electromagnetic storage devices. The personal computer system has a high speed local processor data bus, at least one logical processor device coupled directly to the local processor bus and capable of signalling through the local processor bus an occurrence of the transfer of blocks of data, and a storage controller coupled directly to the local processor bus for regulating communications between the processor device and storage memory devices. The storage controller has a FIFO memory for transitory storage of blocks of data being exchanged with the local processor bus and is capable of signalling through the local processor bus the state of the FIFO memory. The processor device and storage controller cooperate for exchange of blocks of data between the local processor bus and FIFO memory when the FIFO memory has available one of data to be transferred and space for reception of data and for emptying of the FIFO memory through the local processor bus as necessary.

11 Claims, 6 Drawing Sheets

PERSONAL COMPUTER SYSTEM HAVING HIGH SPEED LOCAL PROCESSOR BUS AND STORAGE CONTROLLER WITH FIFO MEMORY COUPLED DIRECTLY THERETO

RELATED APPLICATION

This application is a continuation of copending prior application Ser. No. 07/712,233 filed 7 Jun. 1991.

TECHNICAL FIELD

This invention relates to personal computers, and more particularly to a personal computer using a small computer systems interface (SCSI) controller coupled directly to the local processor bus for controlling data transfer with storage memory devices such as fixed or removable media electromagnetic storage devices.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

As the development of personal computers has advanced, there have been proposals for certain standards to be established among makers and users of such apparatus for the purpose of enabling greater exchangability of components and the like. One such standard which have achieved some broad acceptance is the small computer systems interface (SCSI) standard for data communication to and from storage memory devices. For the present purposes, "storage memory devices" is defined broadly to include all devices capable of storing data in digital form, with particular emphasis on such devices as fixed or removable media electromagnetic storage devices (also known as hard and floppy disk drives), electro-optical, tape and other storage devices. SCSI controllers have been known and used prior to this invention, and will be familiar to the knowledgeable reader. In prior personal computer systems, SCSI controllers have typically been arranged as option or accessory devices, accessed by the system through the accessory or input/output or I/O bus. It is now contemplated to provide a SCSI controller as a single very large scale integrated (VLSI) device or application specific integrated circuit (ASIC) chip, and to provide for connection of that controller directly with the local processor bus. The purpose of so providing such a controller is to achieve enhanced performance in terms of expedited data transfers.

Prior SCSI controllers have used a type of memory known as first in, first out (or FIFO), which may be provided by a series of registers. Communication with FIFO memory has been accomplished by a variety of arrangements such as moving a set of bytes of data at a time, or using acknowledge signals as data is moved. Such communication is complicated by direct coupling of a SCSI controller to a local processor bus, where new demands for data transfer control arise.

BRIEF DESCRIPTION OF THE INVENTION

With the foregoing discussion in mind, it is an object of this invention to accommodate the use of FIFO memory in a SCSI controller directly coupled to a local processor bus in a personal computer. In realizing this object of the present invention, the FIFO is allowed to empty or fill without overrun or underrun in communicating with the local processor bus.

A further object of this invention is to provide signals exchanged between a microprocessor directly coupled to a local processor bus of a personal computer and normally controlling the bus and an associated SCSI controller also directly coupled to the bus, with the signals informing the microprocessor of the flow of data between the controller and the bus. In realizing this object of the present invention, signals indicative of the number of bytes of data to be transferred are generated and exchanged.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
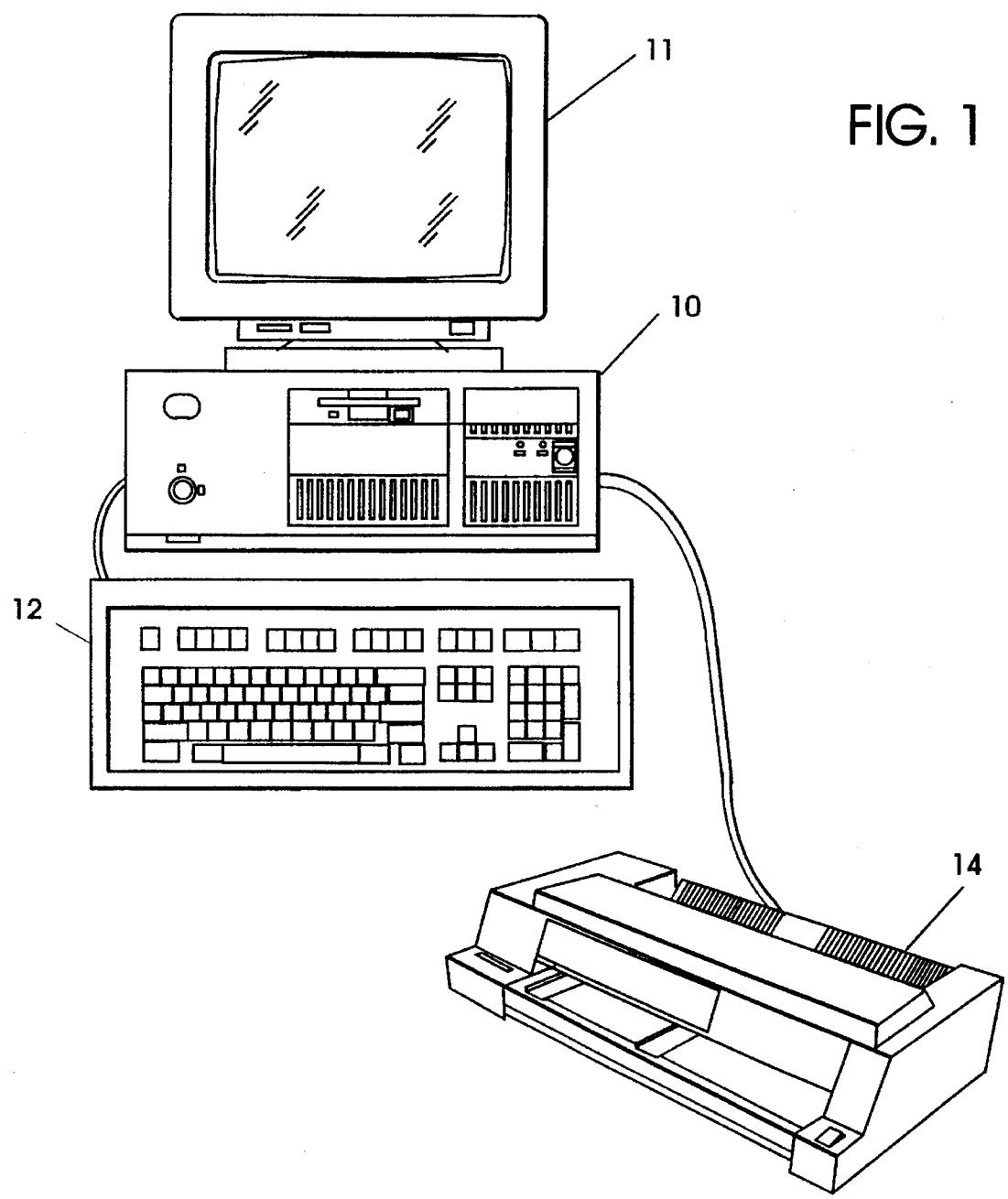
FIG. 1 is a perspective view of a personal computer embodying this invention.
Figure 2:
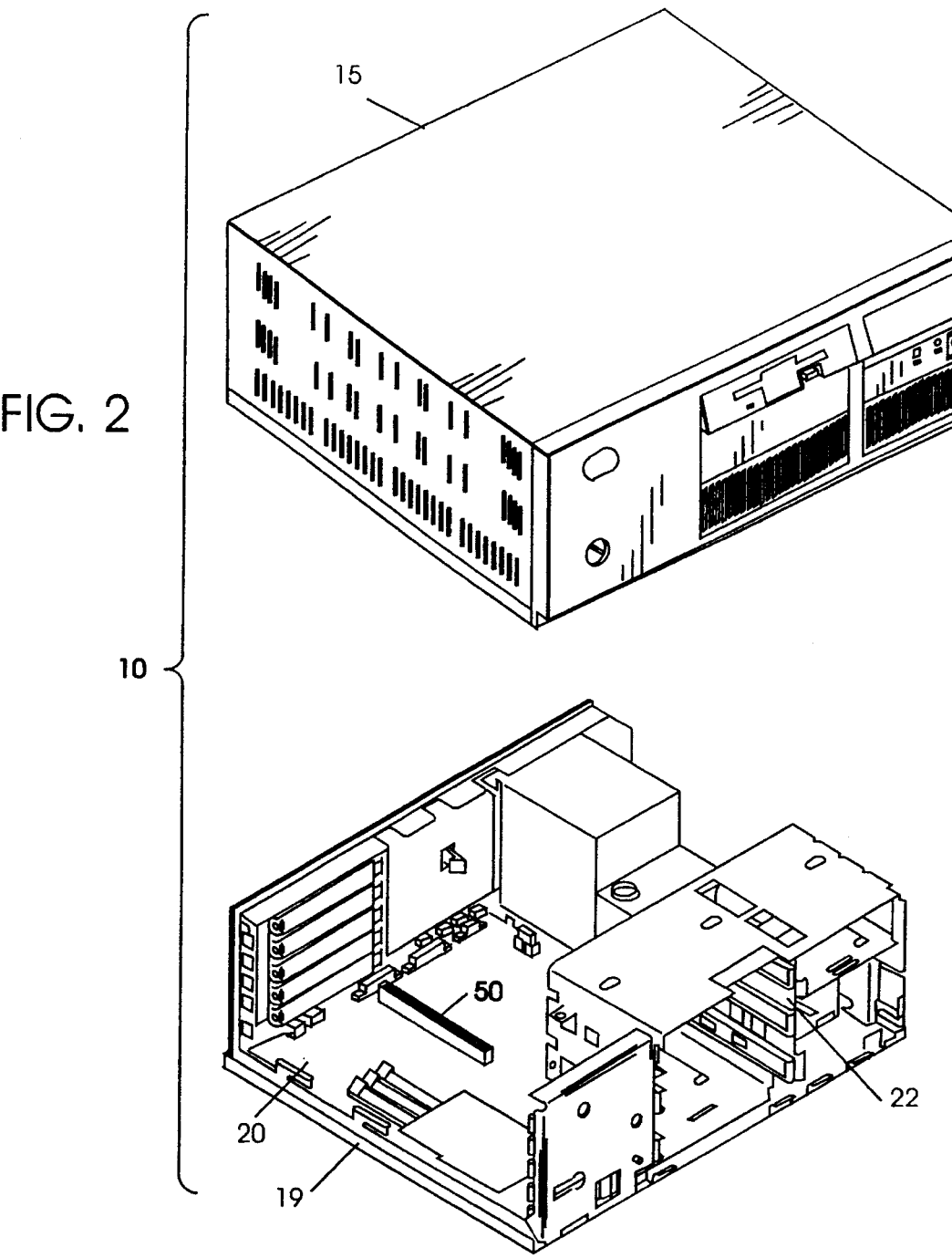
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

Figure 3:
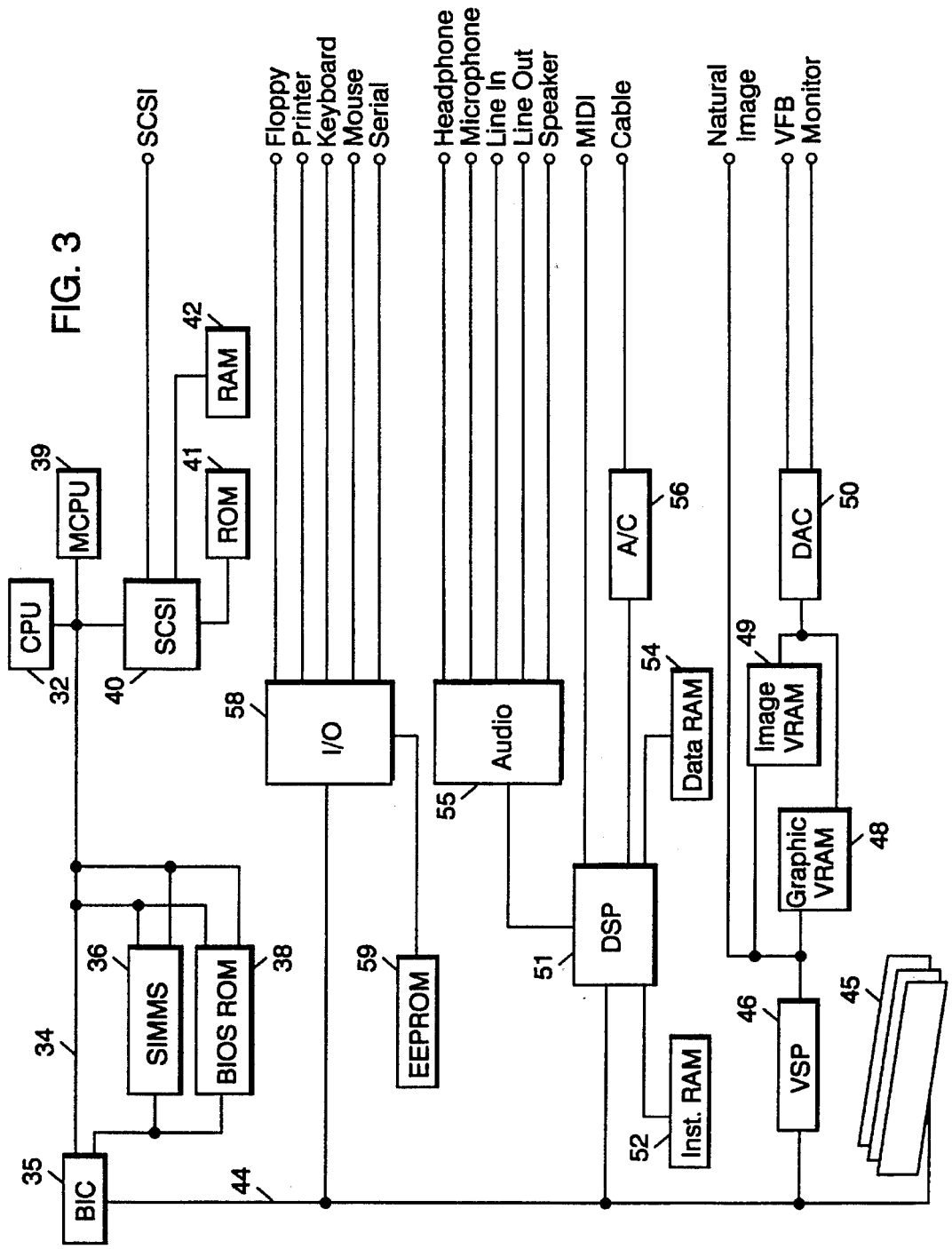
FIG. 3 is a schematic view of certain components of the personal computer of FIGS. 1 and 2.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22. Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor. Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation, be connected or connectable with Read Only Memory (ROM) 41, RAM 42, and suitable external devices of a variety of types as facilitated by the I/O connection indicated to the right in the Figure. The SCSI controller 40 functions as a storage controller in controlling storage memory devices such as fixed or removable media electromagnetic storage devices (also known as hard and floppy disk drives), electro-optical, tape and other storage devices.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/O device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

In order to provide for effective data transfer between the local processor bus 34 and the storage controller 40 and particularly a FIFO memory included within the controller 40, the present invention defines certain handshaking protocol signals. The exchange of these signals over the local processor bus 34 prevents overrun of the FIFO memory and underrun to the local processor bus, and allow the local processor bus to go into pipeline operation mode without the loss of data integrity and the FIFO memory to pass data while avoiding corruption of the data. The states of the signals under certain operating conditions are illustrated in accompanying FIGS. 4, 5 and 6, to which reference will be made.

The signals originating from the storage controller 40 are known here as ACCEPT, FLUSH, ONE, TWO, and THREE. ACCEPT informs logical processors directly coupled to the local processor bus 34 (such as the microprocessor 32, mat coprocessor 39 and the bus interface controller 35) that there is either data or space available in the FIFO memory 60 and that transfers can begin. ACCEPT is inactive (high in the accompanying Figures) where there is either not enough data or space to allow transfers. The storage controller 40 thus has the capability of signalling through the local processor bus 34 the availability of one of blocks of data stored in the FIFO memory for transfer and space in the FIFO memory for reception of blocks of data to be transferred. FLUSH informs the local processor bus logic that there is a need to remove all data stored in the FIFO memory, and is used only when data is being transferred from the FIFO memory to the local processor bus. FLUSH will remain active until all data is transferred out of the FIFO memory.

The storage controller also has the capability of signalling through the local processor bus occurrences of storage of at least two predetermined different numbers of blocks of data to be delivered to said local processor bus. This capability is provided by the signals ONE, TWO and THREE. ONE informs the local processor bus logic that there is one byte of data left in the FIFO memory. ONE is used when data is transferred from the FIFO memory to the system, and allows the system to determine if a byte transfer only is required. TWO informs the local processor bus logic that there are two bytes of data left in the FIFO memory and is used when data is transferred from the FIFO memory to the system. The TWO signal allows the local processor bus logic to determine whether enough data exists for a word transfer (a "word" being two bytes) or if pipelining operation can continue for one more cycle. THREE is used similarly to ONE and TWO, to indicate that there are three bytes of data in the FIFO memory for transfer to the system. If THREE is active, then the local processor bus logic allows pipelining operation to continue.

The signals originating from the local processor bus logic are here known as ACK, HBV and LBV. The ACK signal is an acknowledgement, and informs the FIFO memory that data is being transferred. The HBV and LBV signals are used to signal through the local processor bus which portion of a block of data is to be considered valid. Assuming for present purposes that the block of data is a word of two bytes, then the HBV and LBV signals are indicative of the validity (or usefulness) of the entirety of a block of data (a word), a first half of a block of data (a byte), and a second half of a block of data (a byte). When ACK goes active indicating a data transfer (as it will at the beginning of each transfer), the storage controller 40 must determined from HBV and LBV the amount of data to be transferred and which portion is to be deemed valid.

Figure 4:
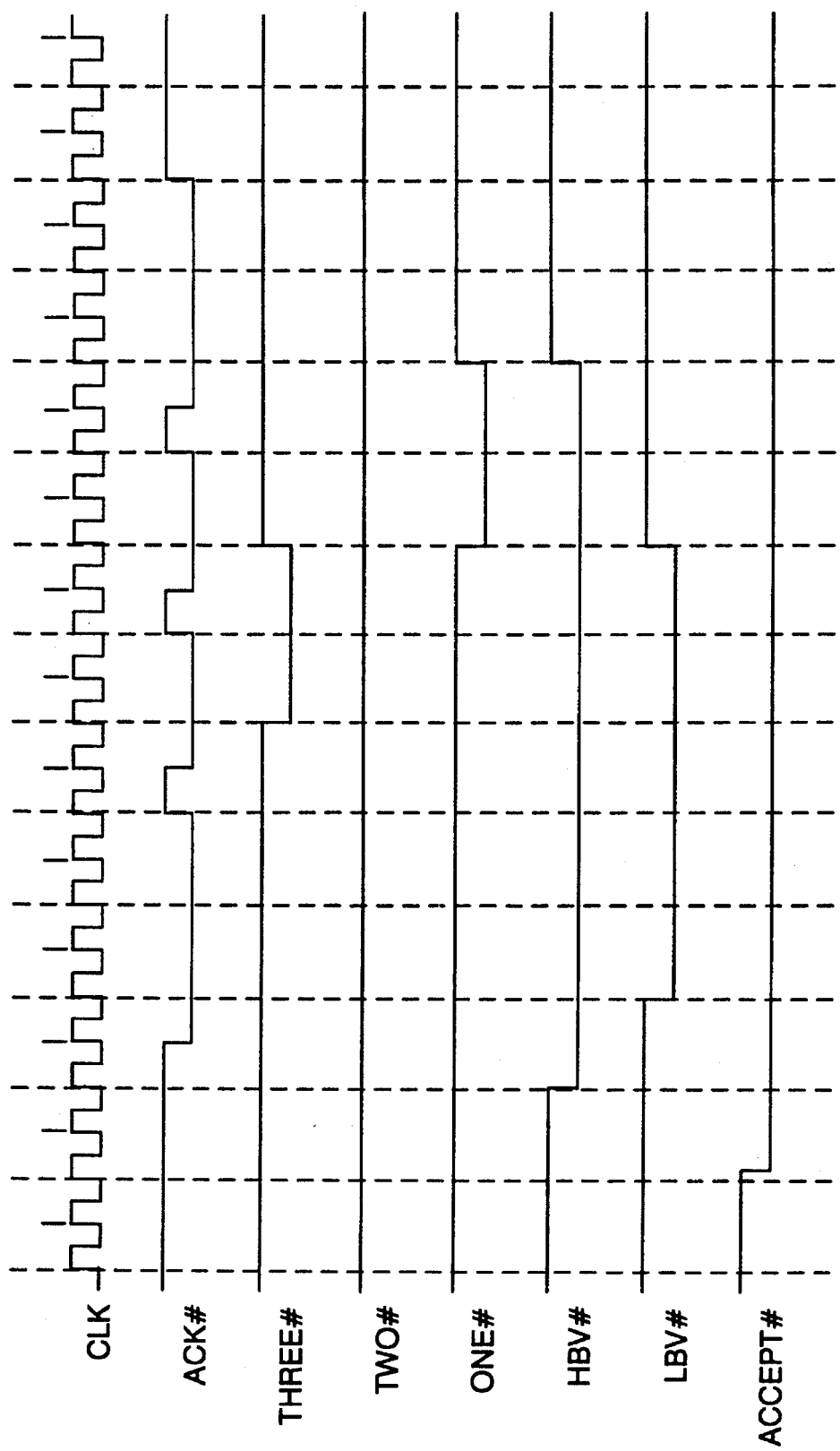
FIG. 4 is a diagram of certain signals exchanged between a local processor bus and SCSI controller in the personal computer of FIGS. 1 through 3.

Transfer of data to the FIFO memory from the system will begin with ACCEPT going active (FIG. 4). ACK will go active at the beginning of each transfer, while HBV and LBV will indicate a word or byte transfer. Once the FIFO memory has reached a threshold level of fill, ACCEPT will be made inactive and the transfer of data will stop with the last cycle started.

Figure 5:
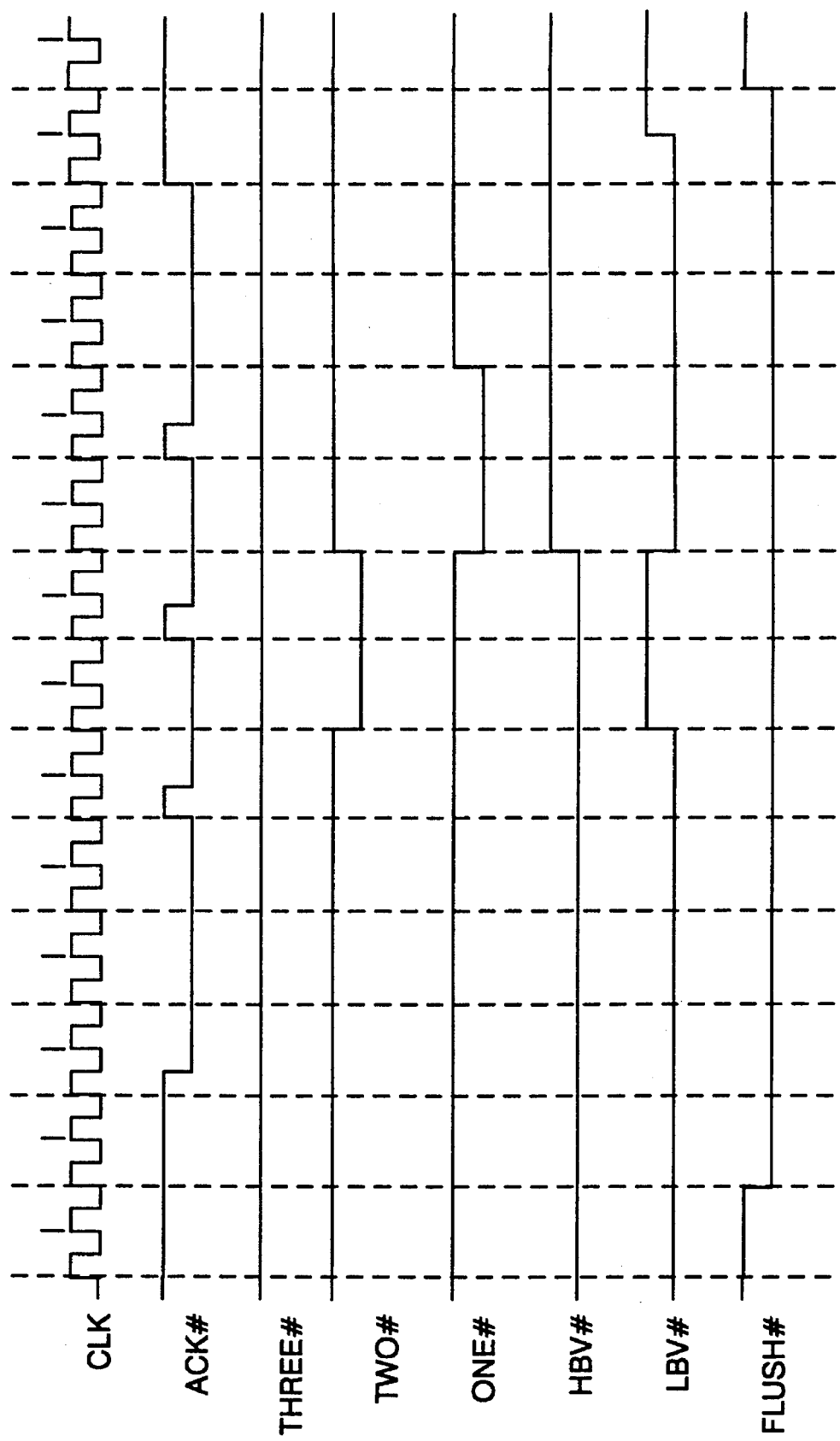
FIG. 5 is a diagram similar to FIG. 4 illustrating certain other signals exchanged between a local processor bus and SCSI controller in the personal computer of FIGS. 1 through 3.
Figure 6:
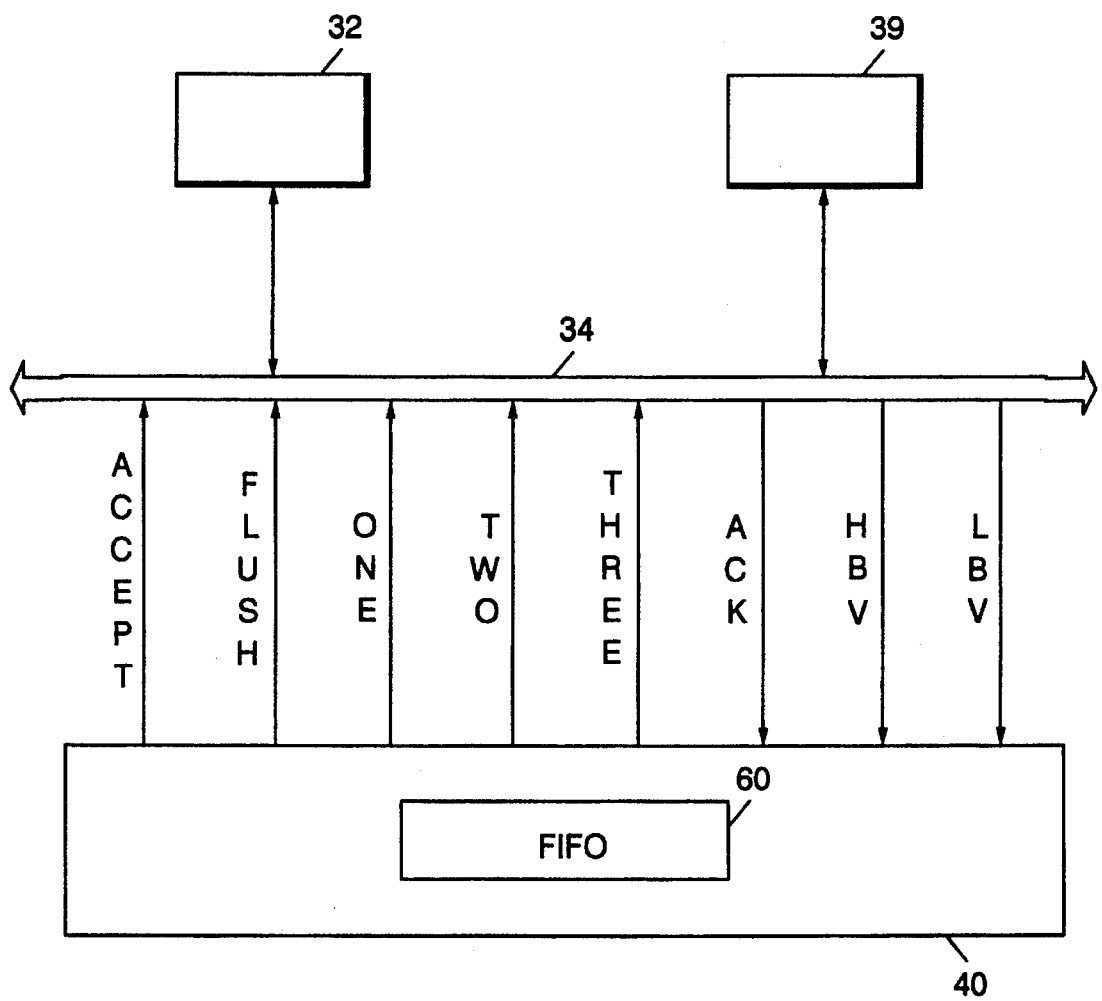
FIG. 6 is a schematic diagram illustrating the signals exchanged between the local processor bus and SCSI controller shown in FIGS. 1 through 3.

Transfer of data from the FIFO memory to the system will begin either with ACCEPT going active or with FLUSH going active (FIG. 5). ACK will go active at the beginning of each transfer. HBV and LBV will indicate word or byte transfers, and which portion (if less than a word) is to be considered valid. The signals ONE, TWO and THREE are used to determine the transfer of data and whether pipelining can be continued. Once the last bye is transferred, FLUSH goes inactive. If ACCEPT initiates the transfer rather than FLUSH, then ACCEPT will become inactive once a threshold level of fill has been reached, and the transfer of data will stop with the last cycle started.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:

a central processing unit (CPU) for controlling operation of the personal computer system operation and functioning inter alia as a logical processor device for signaling an occurrence of the transfer of blocks of data;

a high speed local processor data bus coupled directly to said central processing unit and having data, address and control components for exchanging signals with elements of the personal computer system;

at least one additional logical processor device coupled directly to said local processor bus, said additional processor device for signalling through said local processor bus an occurrence of the transfer of blocks of data and a storage controller coupled directly to said local processor bus for regulating communications between said central processing unit and said additional processor device and storage memory devices, said storage controller having FIFO memory for transitory storage of blocks of data being exchanged with said local processor bus, said storage controller functioning for signaling through said local processor bus to said CPU and said at least one additional logical processor (1) a state of the FIFO memory and (2) to initiate a transfer of block(s) of data between said FIFO memory and Said local processor bus, and said CPU and said additional logical processor function for signaling through said local processor bus to said storage controller an occurrence of said transfer of block(s) of data between said FIFO memory and said local processor bus;

said central processing unit and said additional processor device and said storage controller cooperating for exchange of blocks of data between said local processor bus and said FIFO memory when said FIFO memory has available one of data to be transferred and space for reception of data and for emptying of said FIFO memory through said local processor bus as necessary said CPU and said additional logical processor device function for generating signals, and said storage controller functions for recognizing said signals which distinguish among a validity of (a) the entirety of a block of data, (b) a first half of a block of data, and (c) a second half of a block of data.

2. A personal computer system according to claim 1 wherein said storage controller functions for signaling through said local processor bus to said CPU and said at least one additional processor the availability of one of (a) blocks of data stored in the FIFO memory for transfer and (b) space in the FIFO memory for reception of blocks of data to be transferred.

3. A personal computer system according to claim 2 wherein said central processing unit and said additional processor device function for signaling through said local processor bus to said storage controller which portion of a block of data is to be considered valid.

4. A personal computer system according to claim 3 wherein said storage controller functions for recognizing signals which are (a) transmitted by said CPU or said additional logical processor and passed through said local processor bus to said storage controller and (b) indicative of said occurrence of the transfer of block(s) of data and of which portion of said block(s) of data is to be considered valid.

5. A personal computer system according to claim 4 wherein said storage controller functions for recognizing signals which distinguish among a validity of the entirety of (a) a block of data, (b) a first half of a block of data, and (c) a second half of a block of data.

6. A personal computer system according to claim 1 wherein said central processing unit and said additional processor device function for signaling through said local processor bus to said storage controller which portion of a block of data is to be considered valid.

7. A personal computer system according to claim 1 wherein said storage controller functions for recognizing signals which are (a) transmitted by said CPU or said additional logical processor and passed through said local processor bus to said storage controller and (b) indicative of said occurrence of the transfer of block(s) of data and of which portion of said block(s) of data is to be considered valid.

8. A personal computer system according to claim 1 wherein said storage controller functions for signaling through said local processor bus to said CPU and said at least one additional logical processor occurrences of storage of at least two predetermined different numbers of blocks of data to be delivered from said FIFO memory to said local processor bus.

9. A personal computer system according to claim 8 wherein said CPU and said at least one additional logical processor device function for distinguishing between signals from said storage controller indicative of numbers of blocks of data to be delivered.

10. A personal computer system according to claim 1 wherein said storage controller is a small computer system interface controller.

11. A personal computer system comprising:

a central processing unit for controlling the personal computer system operation and functioning inter alia as a logical processor device for signaling an occurrence of the transfer of blocks of data;

a high speed local processor data bus coupled directly to said central processing unit and having data, address and control components for exchanging signals with elements of the personal computer system;

at least one additional logical processor device coupled directly to said local processor bus said additional processor device for signalling through said local processor bus an occurrence of the transfer of blocks of data and which portion of a block of data is to be considered valid; and a storage controller coupled directly to said local processor bus for regulating communications between said central processing unit and said additional processor device and storage memory devices, said storage controller having FIFO memory for transitory storage of blocks of data being exchanged with said local processor bus and functioning for signaling through said local processor bus to said CPU and said at least one additional logical processor (1) the availability of one of blocks of data stored in the FIFO memory for transfer and space in the FIFO memory for reception of blocks of data to be transferred and (2) to initiate a transfer of block(s) of data between said FIFO memory and said local processor bus, said CPU and said additional logical processor being operative to signal through said local processor bus to said storage controller an occurrence of said transfer of block(s) of data between said FIFO memory and said local processor bus and which portion of a block of data is to be considered valid;

said storage controller also functions for recognizing signals transmitted by said CPU or said additional logical processor and passed through said local processor bus to said storage controller and indicative of an occurrence of the transfer of data and of which portion of a block of data is to be considered valid;

said central processing unit and said additional processor device additionally function for generating the signals, and said storage controller for recognizing said signals which distinguish among a validity of the entirety of a block of data, a first half of a block of data, and a second half of a block of data, and cooperating for exchange of blocks of data between said local processor bus and said FIFO memory when said FIFO memory has available one of data to be transferred and space for reception of data and for emptying of said FIFO memory through said local processor bus as necessary.

* * * * *